(12) United States Patent
Sakumura et al.

(10) Patent No.: US 10,748,253 B2
(45) Date of Patent: Aug. 18, 2020

(54) PROCESSING APPARATUS, METHOD, AND PROGRAM

(71) Applicant: Rigaku Corporation, Tokyo (JP)

(72) Inventors: Takuto Sakumura, Tokyo (JP);
Yasukazu Nakaye, Tokyo (JP);
Kazuyuki Matsushita, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 144 days.

(21) Appl. No.: 16/161,847

(22) Filed: Oct. 16, 2018

(65) Prior Publication Data
US 2019/0114746 A1    Apr. 18, 2019

(30) Foreign Application Priority Data

Oct. 17, 2017   (JP) ................................. 2017-201173

(51) Int. Cl.
*G06T 5/00*    (2006.01)
*G06T 7/13*    (2017.01)
*G01T 1/17*    (2006.01)
*G06T 3/40*    (2006.01)

(52) U.S. Cl.
CPC ............... *G06T 5/001* (2013.01); *G01T 1/17* (2013.01); *G06T 3/40* (2013.01); *G06T 7/13* (2017.01); *G06T 2207/10116* (2013.01)

(58) Field of Classification Search
CPC .. G06T 5/001; G06T 7/13; G06T 3/40; G06T 2207/10116; G01T 1/17
See application file for complete search history.

(56) References Cited

U.S. PATENT DOCUMENTS

| 6,928,144 | B2 | 8/2005 | Li et al. |
| 2008/0013784 | A1* | 1/2008 | Takeshima ........... G06K 9/6226 382/100 |
| 2016/0377748 | A1 | 12/2016 | Sakumura et al. |
| 2017/0365075 | A1* | 12/2017 | Meganck .............. G06T 11/006 |

FOREIGN PATENT DOCUMENTS

| JP | 2005057281 A | 3/2005 |
| JP | 2017009503 A | 1/2017 |

OTHER PUBLICATIONS

Juan Pablo Balbuena Valenzuela, "Development of innovative silicon radiation detractors—TDX", p. 115-116.

* cited by examiner

*Primary Examiner* — Ruiping Li
(74) *Attorney, Agent, or Firm* — Birch, Stewart, Kolasch & Birch, LLP.

(57) ABSTRACT

A processing apparatus that enables margin correction of X-ray intensity data includes a calculation unit configured to calculate an expansion rate of X-ray intensity data detected in a unit region on a marginal side on a basis of an intensity distribution resulted from detection of uniform X-ray and a first function generation unit configured to generate an allocation function that allocates the X-ray intensity data detected in the unit region on the marginal side to an outside unit region, on the basis of the expansion rate. Enabling margin correction on the basis of the intensity distribution resulting from detection of uniform X-ray makes it possible to correct the distortion of intensity distribution on the marginal side. As a result, it is possible to expand the detection region of X-ray intensity data.

17 Claims, 12 Drawing Sheets

PROCESSING APPARATUS, METHOD, AND PROGRAM

CROSS-REFERENCE TO RELATED APPLICATION

This application claims priority to Japanese Patent Application No. 2017-201173, filed Oct. 17, 2017, the contents of which are incorporated herein by reference in their entirety.

BACKGROUND

The present invention relates to a processing apparatus, a method, and a program that enable margin correction of X-ray intensity data.

In recent years, hybrid pixel array detectors have been developed, which have pixels tiled vertically and horizontally on the backside of the sensor layer of semiconductors, with read-out chips being provided on the backside of the pixels. A detector with a pixel size of about 100 µm, for example, has a high positional resolution and is effective for measurement of diffracted X-rays.

For such a hybrid pixel array detector, forming a pattern of a guard ring on the margin is common as a measure against noise or leak current (see Patent Document 1). The structure results in that the sensitive region of the X-ray detection surface spreads outward along the electric field, and the region with tiled pixels becomes smaller than the sensitive region. In addition, the electric field of the margin within the sensor layer is distorted, and therefore the equipotential surface of the margin is a curved surface (see non-Patent Document 1). As a result, pixels on the margin cover a large area of the detection surface, and signals originated from outside the pixel positions on the detection surface enter the pixels.

On the other hand, against the existing phenomenon that a count value tends to be different from count values at other positions due to gaps between the read-out chips, there has been proposed an algorithm that sets virtual pixels and allocates count values among the virtual pixels, providing randomness thereto.

As described above, a hybrid pixel array detector requires intensity correction of the margin since signals originated from outside the pixel positions on the detection surface enter the pixels. In addition, aligning detectors for the purpose of achieving a larger area causes the margin of the detectors to be an undetectable region, whereby a gap is created.

SUMMARY

It is an object of the present invention, which has been made in view of the aforementioned circumstances, to provide a processing apparatus, a method, and a program that allow for correcting distortion of the intensity distribution of the margin.

(1) In order to achieve the aforementioned object, a processing apparatus of the present invention is a processing apparatus that enables margin correction of X-ray intensity data, the apparatus being characterized in that it includes: a calculation unit configured to calculate an expansion rate of X-ray intensity data detected in a unit region on a margin side, on the basis of an intensity distribution resulted from detection of uniform X-ray; and a first function generation unit configured to generate an allocation function that allocates the X-ray intensity data detected in the unit region on the marginal side to an outside unit region, on the basis of the expansion rate.

As thus described, enabling margin correction on the basis of the intensity distribution resulted from detection of uniform X-ray makes it possible to correct the distortion of intensity distribution on the marginal side. As a result, it is possible to expand the detection region of X-ray intensity data. It is then possible to reduce the undetectable gap between detectors when a plurality of detectors is combined into a module.

In addition, the processing apparatus of the present invention is characterized in that the calculation unit calculates the expansion rate using a ratio of X-ray intensity data detected in a unit region on the marginal side against X-ray intensity data detected in an inner unit region. Accordingly, it becomes possible to correct the distortion that occurs due to a potential gradient intrinsic to the margin.

In addition, the processing apparatus of the present invention is characterized in that the calculation unit uses a mean value of X-ray intensity data detected in a unit region within a particular range provided inside, as the X-ray intensity data detected in the inner unit region. Accordingly, it is possible to generate a criterion for measuring the distortion of the margin using highly reliable data.

In addition, the processing apparatus of the present invention is characterized in that it further includes a second function generation unit configured to generate a uniformity correction function for the intensity distribution obtained via correction by the allocation function of the intensity distribution resulted from detection of uniform X-ray. Performing uniformity correction after the margin correction in the above manner allows for efficiently generating a correction function through a one-time uniformity correction.

In addition, the processing apparatus of the present invention is characterized in that it further includes a correcting unit configured to use the allocation function to perform margin correction of the intensity distribution detected by measurement. Accordingly, it is possible to correct the measured data using a function capable of correcting the distortion of the intensity distribution on the marginal side.

In addition, the processing apparatus of the present invention is characterized in that the correction unit allocates the X-ray intensity data detected in the unit region on the marginal side, providing randomness thereto. Accordingly, it is possible to provide the allocation with natural statistical variation, thereby reducing the influence of allocation in the vicinity of the border of unit regions.

In addition, the processing apparatus of the present invention is characterized in that the correction unit uses the uniformity correction function to perform uniformity correction of the intensity distribution corrected by margin correction. Accordingly, it is possible to perform margin correction and uniformity correction.

In addition, the processing apparatus of the present invention is characterized in that the intensity distribution detected by the measurement is data provided by diffraction measurement of a single crystal. Accordingly, it is possible to measure a plurality of diffraction spots of a single crystal simultaneously in an expanded wide range.

In addition, a method of the present invention is a method that enables margin correction of X-ray intensity data, the method being characterized in that it includes: a step of calculating an expansion rate of X-ray intensity data detected in a unit region on the marginal side, on the basis of an intensity distribution resulted from detection of uniform X-ray; and a step of generating an allocation function that allocates the X-ray intensity data detected in the unit region on the marginal side to an outside unit region, on the basis of the expansion rate. Accordingly, it is possible to correct the distortion of the intensity distribution of the margin. As a result, it is possible to expand the detection region of X-ray intensity data, and reduce the undetectable gap between detectors when a plurality of detectors is combined into a module.

In addition, a program of the present invention is a program that enables marginal correction of X-ray intensity data, the program being characterized in that it causes a computer to perform: a process of calculating an expansion rate of X-ray intensity data detected in a unit region on the marginal side, on the basis of an intensity distribution resulted from detection of uniform X-ray; and a process of generating an allocation function that allocates the X-ray intensity data detected in the unit region on the marginal side to an outside unit region, on the basis of the expansion rate. Accordingly, it is possible to correct the distortion of the intensity distribution of the margin. As a result, it is possible to expand the detection region of X-ray intensity data, and reduce the undetectable gap between detectors when detectors are combined into a module.

According to the present invention, it becomes possible to correct the distortion of the intensity distribution of the margin of an X-ray detector. As a result, it is possible to expand the detection region of X-ray intensity data, and reduce the undetectable gap between detectors when a plurality of detectors is combined into a module.

DETAILED DESCRIPTION

Figure 1:
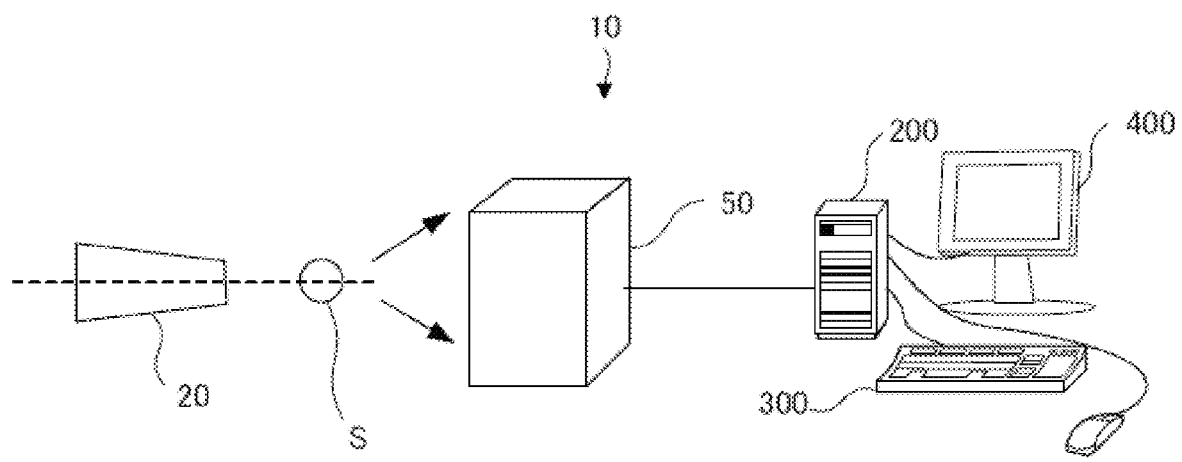
FIG. 1 is a schematic view illustrating an example of a configuration of an X-ray detection system of the present invention.

Next, embodiments of the present invention are explained below, referring to the accompanying drawings. For simplicity of explanation, identical components are provided with identical reference numerals throughout the drawings, with duplicate description being omitted.

Configuration of System

FIG. 1 is a schematic view illustrating an example of a configuration of an X-ray detection system 10. The X-ray detection system 10 includes an X-ray source 20, a sample S, a detector module 50, and a processing apparatus 200, as illustrated in FIG. 1.

The X-ray source 20 generates X-rays by causing an electron flux emitted from a filament which is the cathode to hit a rotor target which is the anticathode, for example. The X-rays emitted from the X-ray source 20 are so-called point-focus X-ray beams.

The margin surface of the rotor target has provided thereon metal such as Mo or Cu for example. When an electron hits the Mo target, an X-ray including a MoKα-ray which is the characteristic ray (wavelength: 0.711 Å) is emitted. When an electron hits the Cu target, an X-ray including CuKα-ray which is the characteristic ray (wavelength: 1.542 Å) is emitted.

The sample S is supported by a sample support device. The detector module 50 detects diffracted X-rays or fluorescence X-rays diffracted by the sample S, for example. The processing apparatus 200 processes the detected count values and outputs the detection result. Details of the detector module 50 and the processing apparatus 200 is explained below.

Configuration of Detector Module

Figure 2:
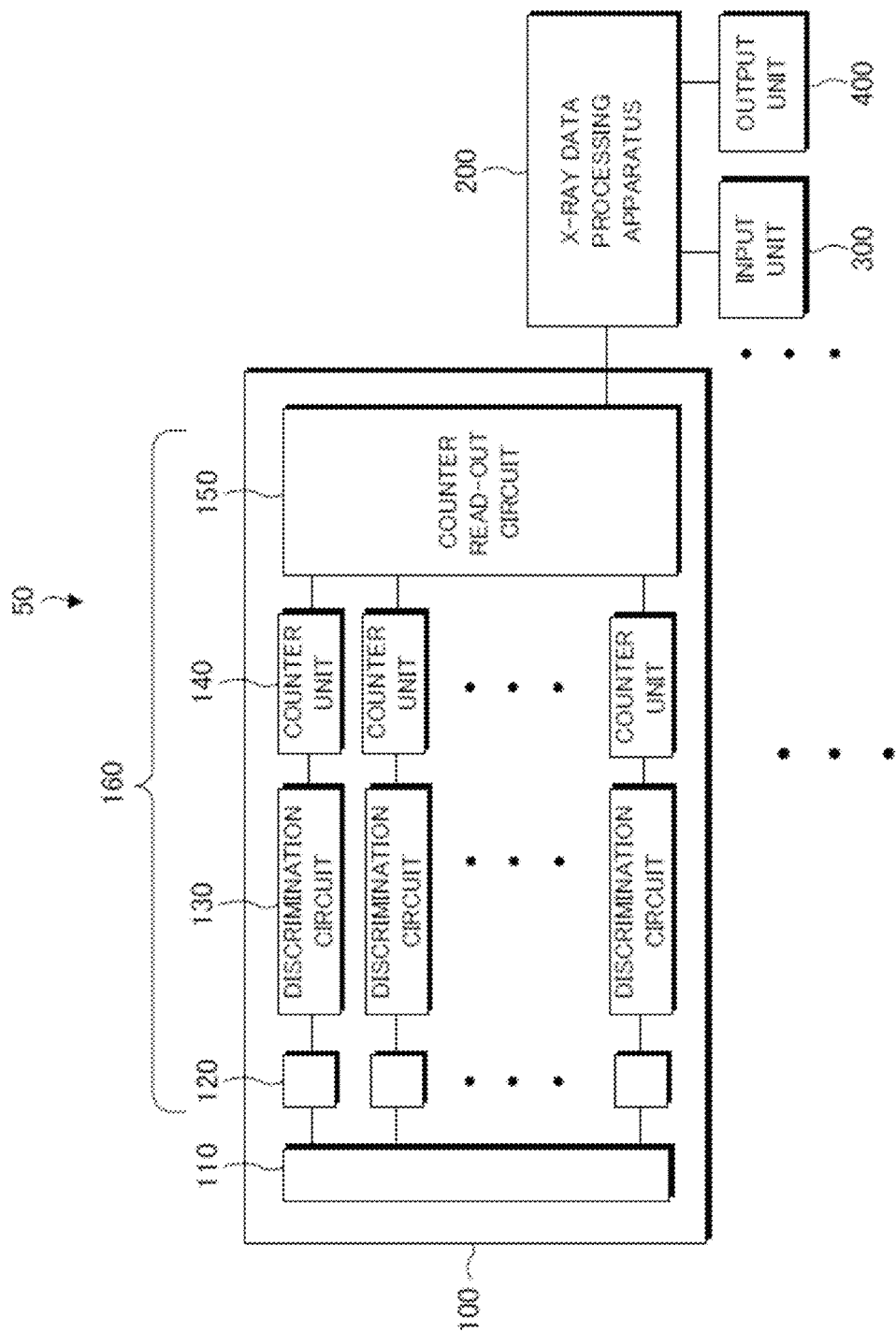
FIG. 2 is a block diagram illustrating a configuration of a detector module and an X-ray data processing apparatus.

FIG. 2 is a block diagram illustrating a configuration of the detector module 50 and the processing apparatus 200. The detector module 50 includes a plurality of X-ray detectors 100 aligned in parallel to the X-ray detection surface. The X-ray detector 100, which is, for example, a photo-counting two-dimensional pixel-array semiconductor detector, includes an X-ray-receiving sensor layer 110 on the X-ray incident side, and an ROIC layer 160 on the back side. Note that the X-ray detector 100 is not limited to a two-dimensional semiconductor detector and may be a one-dimensional semiconductor detector.

The signal generated in the sensor layer 110 is read out in the ROIC layer 160. The ROIC layer 160 has a plurality of pixels 120, discrimination circuits 130, counter units 140, and a counter read-out circuit 150. The plurality of pixels 120, being tiled in a two-dimensionally arrayed manner relative to the sensor layer 110, are regularly arranged essentially in a uniform manner. The discrimination circuits 130 are respectively connected to the plurality of pixels 120, with the counter units 140 each being connected to each of the discrimination circuits 130. The counter read-out circuit 150 is connected to each one of the counter units 140. Note that a pixel is a unit region of detection and may be a strip.

The discrimination circuit 130 discriminates and outputs the pulsed signals from the pixels 120 by each X-ray wavelength. The counter units 140 count the numbers of respective signals which have been discriminated into each wavelength by the discrimination circuit 130. The counter units 140 has built therein as many counter circuits as the number of discrimination s so that it is possible to count the numbers of respective pulsed signals which have been discriminated by the discrimination circuit 130, for example. The output signal of the counter read-out circuit 150 is transmitted through a communication line to the processing apparatus 200 as intensity distribution data of X-rays separated by an energy threshold value. Note that the data may be transmitted to the processing apparatus 200 wirelessly or via a medium.

The processing apparatus 200 is configured by a PC (personal computer), a server, or a circuit, for example, and it is preferred to be a PC. A PC is configured by, for example, a CPU for performing arithmetic operation control, a memory for storing data, system software stored in a predetermined region in the memory, application program software stored in another predetermined region in the memory, or the like.

The processing apparatus 200 has a keyboard or the like connected thereto as an input unit 300 for receiving input from a user. In addition, the processing apparatus 200 has connected thereto an output unit 400 such as a display, a printer, or the like. The output unit 400 outputs the measurement result in response to instructions from the processing apparatus 200.

Sensor Layer and Distortion of Intensity Distribution

Figure 3:
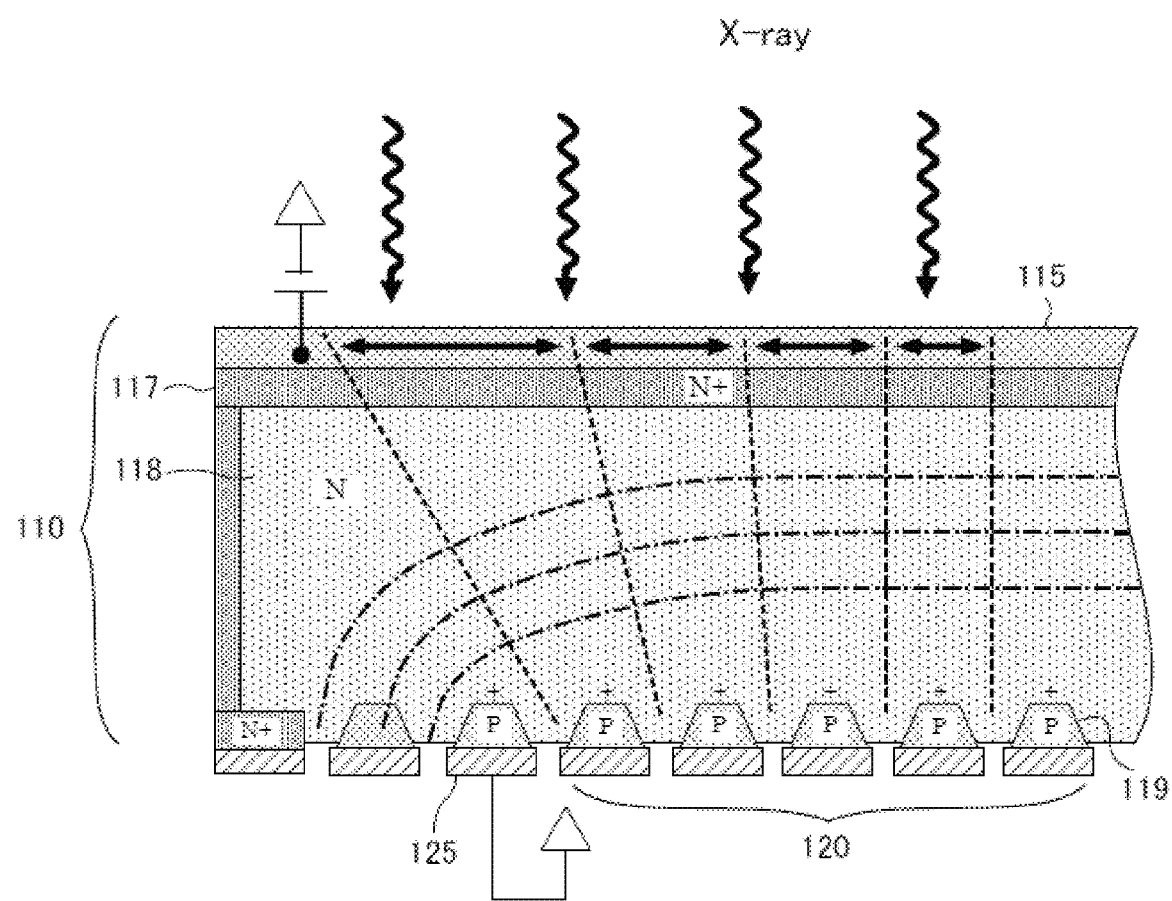
FIG. 3 is a cross-sectional view illustrating a configuration of an X-ray detector.

FIG. 3 is a cross-sectional view illustrating a configuration of the sensor layer 110. In the example illustrated in FIG. 3, the sensor layer 110 includes an incident layer 115, an N+ layer 117, an N-bulk layer 118, and P+ layers 119. The incident layer 115 is a layer covering the surface on which X-rays are incident. The N+ layer 117 is formed by an impurity-rich N-type semiconductor, the N-bulk layer 118 is formed by an impurity-poor N-type semiconductor, and the P+ layers are formed by an impurity-rich P-type semiconductor. With the N-bulk layer 118 forming a sensitive region, a signal is generated by an X-ray incident on the layer, and each of the P+ layers transmits the generated signal to a corresponding one of the pixels 120. Provided that the position on which the X-ray is incident is the center of the surface of the sensor layer 110, the signal is transmitted to one of the pixels 120 located at the position.

However, a guard ring 125 is formed on the margin of the sensor layer 110, the guard ring 125 being formed in a manner surrounding the marginal side of the sensor layer 110. The structure causes the electric field around the margin to be distorted in the N-bulk layer 118, with the equipotential surface of the margin forming a curved surface convex in the direction of the incident layer 115. And in the incident layer 115, the sensitive region spreads outside the projection region of the pixels 120 along the electric field. In FIG. 3, with dot-and-dash lines indicating equipotential surfaces, potential gradients have occurred as indicated by the dot-and-dash lines and, as a result, the sensitive region covered by the pixels 120 on the margin grows larger as indicated by the dashed lines and, unless any measure is taken, the intensity distribution of X-rays at the margin is detected as being distorted.

Therefore, margin correction becomes necessary against signals originated from outside a pixel and entering the pixel. In such a case, although the intensity distribution is distorted unless any measure is taken as discussed above, it is possible to expand the detection region toward the marginal side, provided that the X-ray intensity distribution in the sensitive region can be appropriately corrected. However, a simple intensity correction may result in a distorted X-ray image. In contrast, expansion of the image size allows for obtaining an appropriately corrected X-ray image. For example, assuming a case of forming a 100 μm square pixel, the possibility of expanding the sensitive region outward by 300 μm will increase the positional precision by three pixels. Details of the correction method of intensity distribution are explained below.

The thicker the sensor layer 110 is, the more the sensitivity of high-energy X-rays increases, and therefore the aforementioned correction produces a more significant effect when the sensor layer 110 is thicker. For example, the distortion to be corrected is larger for an X-ray detector with a thickness of 1 mm than that with a thickness of 300 μm. The effect of margin correction is particularly larger since a dislocation of one pixel or more occurs when the thickness of the sensor layer is 300 μm or more.

Gap Between Detectors

Figure 4:
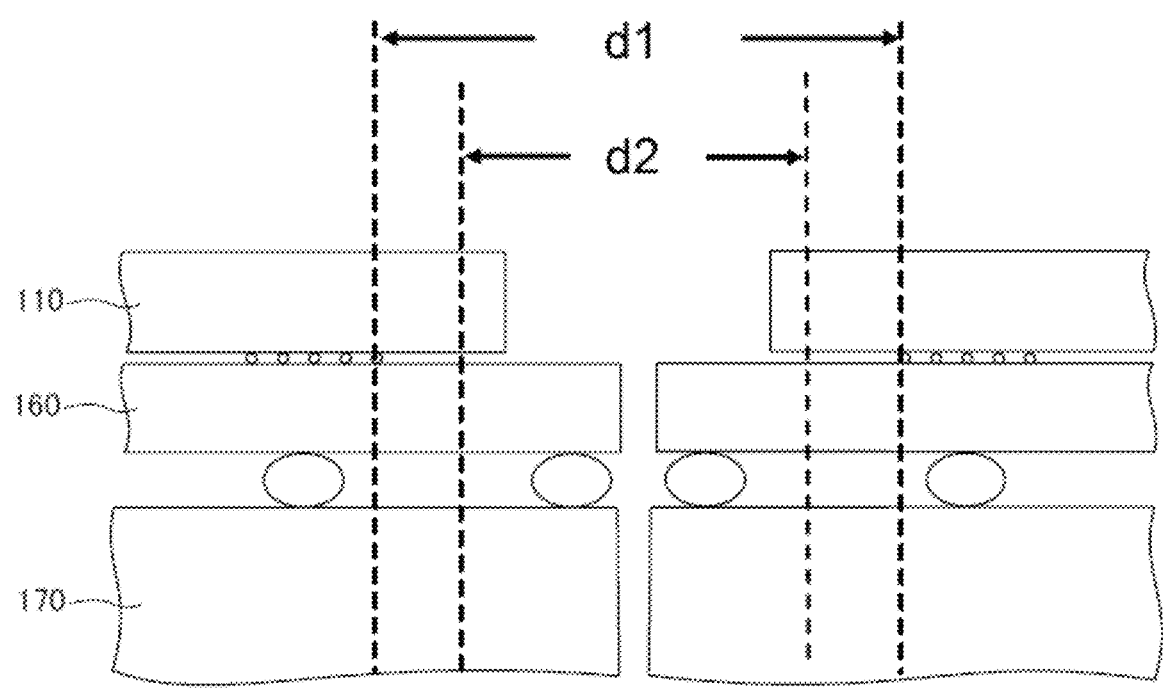
FIG. 4 is a side view illustrating a configuration of parts of the detector modules.

The capability of expanding the detection region toward the marginal side means that it is possible to reduce the undetectable gap between detectors when a plurality of detectors 100 are combined into a module. FIG. 4 is a side view illustrating a configuration of parts of the detector modules 50. FIG. 4 illustrates, in a partially enlarged manner, the interval between the X-ray detectors 100 arranged in alignment. As illustrated in FIG. 4, two of the X-ray detectors 100 are provided on their respective sensor layers 110 are apart with a space, so as to prevent their ends from abutting each other when placed side-by-side on a substrate 170. As a result, there is a space of d1 between the pixels. The space in the detection region can be narrowed down to d2 by expanding the sensitive region of the margin as described above. In other words, the sensitive region can be actually taken wider than the physical pixel arrangement and therefore it is possible to narrow the space.

Configuration of Processing Apparatus

Figure 5:
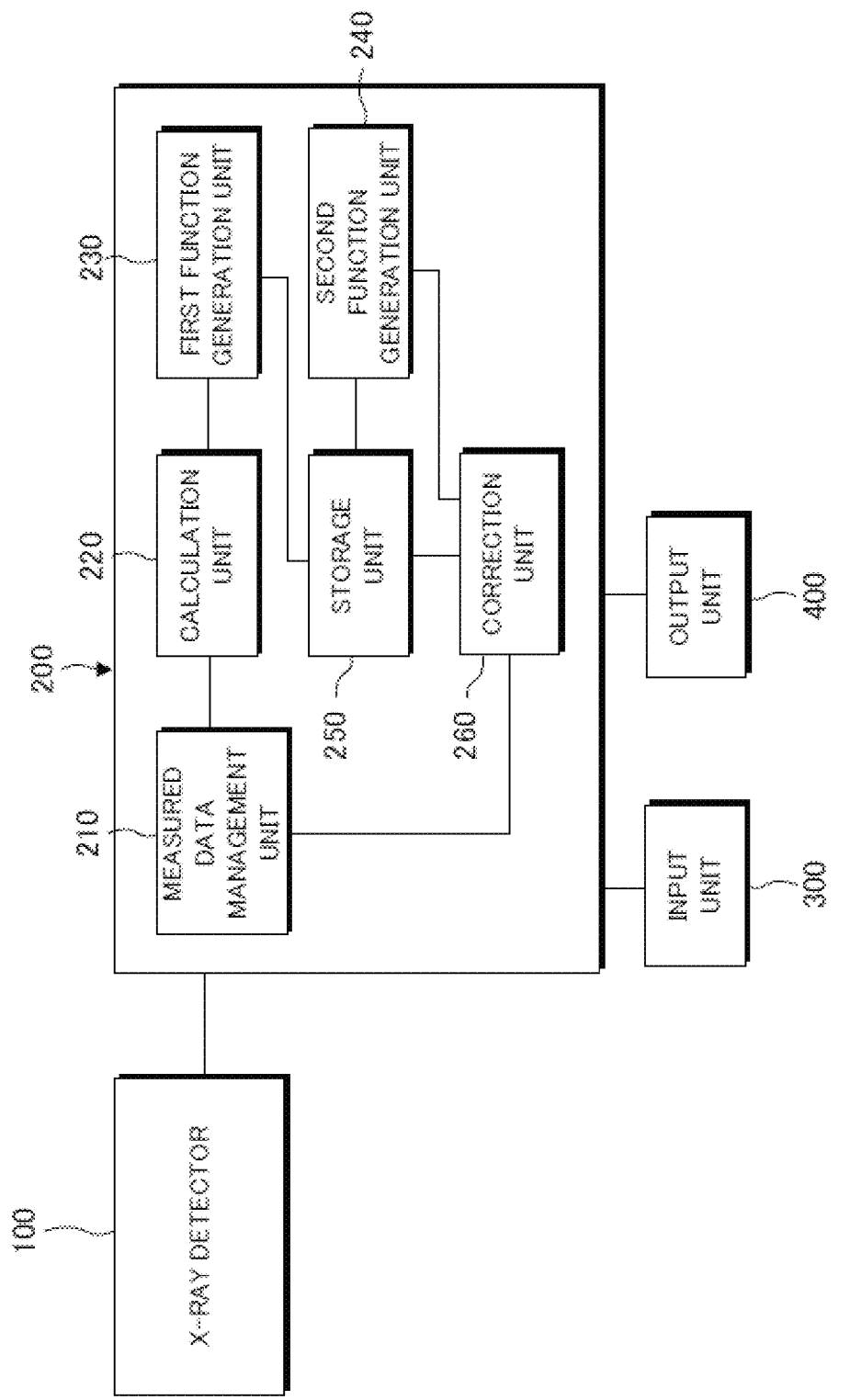
FIG. 5 is a block diagram illustrating a configuration of a processing apparatus of the present invention.

FIG. 5 is a block diagram illustrating a configuration of the processing apparatus 200. The processing apparatus 200, which includes a measured data management unit 210, a calculation unit 220, a first function generation unit 230, a second function generation unit 240, a storage unit 250, and a correction unit 260, allows for margin correction of X-ray intensity distribution. Margin correction may be processed simultaneously (real time) with the measurement of X-ray intensity data.

The measured data management unit 210 receives and manages the count values detected by the X-ray detector 100 for respective pixels. For example, the measured data management unit 210 stores, in association with the address (i, j) of one of the pixels 120, the count value of X-rays detected for the pixel.

The calculation unit 220 calculates the expansion rate of the X-ray intensity data detected for the pixel on the margin, on the basis of the intensity distribution resulted from detection of uniform X-ray. Calculation of the expansion rate is performed considering that the amount of increased intensity that occurs in pixels on a margin corresponds to the amount of expansion toward the margin, on the basis of an assumption that a uniform intensity distribution should be when originally uniform X-rays are irradiated. Note that although it is preferred that the X-ray intensity data is data detected by a two-dimensional detector, it may be detected by a one-dimensional detector. Therefore, the data of the intensity distribution to be calculated is the X-ray intensity data detected for a plurality of pixels aligned in one direction or two directions.

It is preferred that the calculation unit 220 calculates expansion rate using the ratio of the X-ray intensity data detected for pixels at the marginal side against the X-ray intensity data detected for inside pixels. Accordingly, it becomes possible to correct distortion that occurs due to a potential gradient intrinsic to the margin. Note that an inner pixel refers to a pixel at a position close to the center which is not affected by distortion of the electric field in the margin.

It is preferred that the calculation unit 220 uses the mean value of X-ray intensity data detected for pixels within a particular range provided at an inner position as X-ray intensity data detected for inner pixels. For example, it is possible to use X-ray intensity data of pixels in the center or its vicinity. Accordingly, it is possible to generate a criterion for measuring the distortion of the margin using highly reliable data.

The first function generation unit 230 generates an allocation function that allocates X-ray intensity data detected for pixels at the marginal to outside pixels, on the basis of the expansion rate. Specifically, the allocation function may be specified in a table for converting X-ray intensity data for respective pixels and stored as a table. As thus described, allowing for margin correction on the basis of the intensity distribution when performing uniform X-ray irradiation makes it possible to correct the distortion of the intensity distribution of margin. As a result, it is possible to expand the detection region of X-ray intensity data.

The second function generation unit 240 generates a uniformity correction function for the intensity distribution obtained by correcting the intensity distribution resulted from detection of uniform X-ray using the allocation function. A function of uniformity correction may be added in the above manner, in addition to the margin correction function. The uniformity correction function may be specified in a table for converting X-ray intensity data for respective pixels and stored as a table. As a result, it is possible to perform correction efficiently by a one-time uniformity correction after allocation of the X-ray intensity data. Note that generation of spherical surface correction function may also be added.

The storage unit 250 stores the allocation function and the uniformity correction function. The allocation function, in response to input of the positions and the X-ray intensity data of pixels before allocation, outputs the positions and the X-ray intensity data of the pixels after allocation. Specifically, it is preferred that the allocation function is a conversion table that allows for allocation. In addition, the allocation function may convert only the pixels in the margin or its vicinity. The pixels before allocation include only real pixels, and the pixels after allocation include not only real pixels but also virtual pixels provided on the margin. The uniformity correction function, in response to input of the positions and the X-ray intensity data of pixels after allocation, outputs data with the positions and the X-ray intensity data of respective pixels corrected by uniformity correction.

The correction unit 260 performs circumference correction on the intensity distribution detected by measurement using the allocation function. Accordingly, it is possible to correct the measured data using a function capable of correcting distortion of the intensity distribution at the marginal side. It is preferred that the X-ray intensity data detected by measurement are data obtained by diffraction measurement of a single crystal. Accordingly, it is possible to measure a plurality of diffraction spots of a single crystal simultaneously in a wide range. Although powder does not affect intensity correction, a single crystal may exhibit an effect that it is possible to expand the detection surface.

In addition, it is preferred that the correction unit 260 further includes a uniformity correcting unit configured to perform uniformity correction on data corrected by margin correction. Performing uniformity correction after margin correction in the above manner allows for efficient correction.

In addition, it is preferred that the correction unit 260 allocates the X-ray intensity data detected for pixels at the marginal side, providing randomness thereto. Accordingly, it is possible to provide the allocation with natural statistical variation, thereby reducing the influence of allocation in the vicinity of the border of pixels.

In addition, it is preferred that the correction unit 260 provides a shift, as randomness, whose value is a value within a value proportional to the standard deviation of the count values, to the border when dividing the count values. Accordingly, it is possible to provide an appropriate randomness in accordance with the count value for each pixel. In other words, it is preferred to calculate the shift by multiplying, a numerical value obtained to multiply the square root of the count value of the real pixel by a constant coefficient, by a random number equal to or larger than −1 and equal to or smaller than 1. Such a calculation allows for easily calculating count values with randomness provided thereto.

Specifically, the allocation ratio may be calculated as follows. For example, when allocating the count values between a 2/3 region and a 1/3 region, the area ratio is provided with a random shift a1 which is within a value proportional to the standard deviation as follows. Accordingly, it is possible to enlarge the standard deviation by providing the count values with randomness, and also keep the total count value. Note that 2 of the $2/\sqrt{n}$ appearing in formula (1) is a constant coefficient whose value may be changed for each measurement.

$$\frac{2}{3} : \frac{1}{3} \rightarrow \frac{2}{3} \pm \sigma_1 : \frac{1}{3} \mp \sigma_1 \qquad (1)$$

$$\because -\frac{2}{\sqrt{n}} < \sigma_1 < \frac{2}{\sqrt{n}}$$

Generation Method of Correction Function

Figure 6:
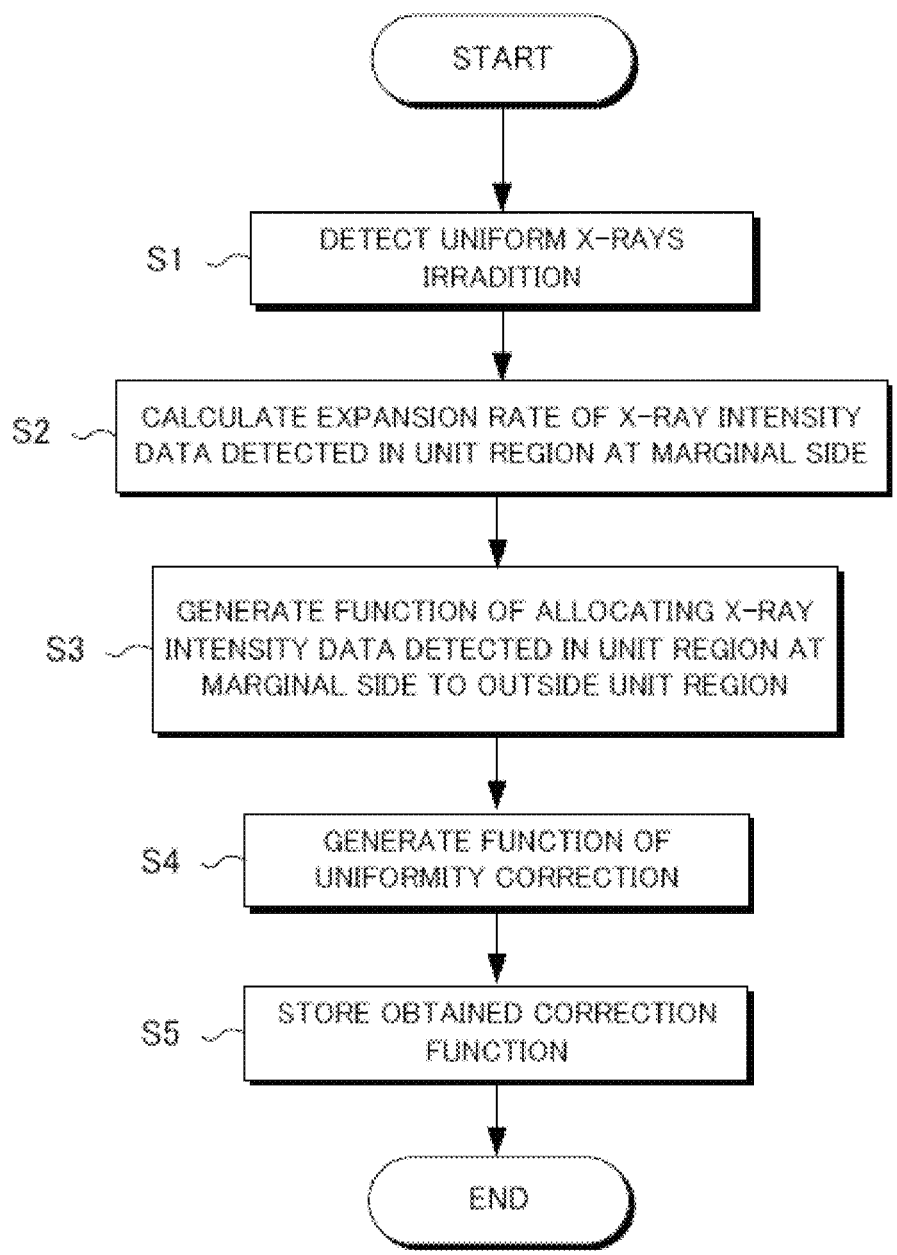
FIG. 6 is a flowchart illustrating a generation method of a correction function of the present invention.

FIG. 6 is a flowchart illustrating a generation method of the correction function. First, uniform X-rays are irradiated on the X-ray detector (Step S1). Among the obtained intensity distribution, expansion rates are calculated for the X-ray intensity data detected in unit regions at the marginal side (Step S2). Using the expansion rates, a function of allocating the X-ray intensity data detected in the unit regions at the marginal side to an outside unit regions is generated (Step S3). A uniformity correction function is generated using the data corrected by margin correction of the intensity distribution of uniform irradiation (Step S4). The obtained correction function of margin correction and uniformity correction is stored (Step S5). Thus, it is possible to perform margin correction and uniformity correction on the intensity distribution measured. Note that the functions of the processing apparatus 200 may be realized by a memory and a processor.

Principle of Margin Correction

The principle of allocation function of margin correction is explained below. First, for simplicity, allocation by a one-dimensional detector is assumed. In a case where the X-ray intensity data for the outmost pixels is n times the X-ray intensity data for pixels in of the center or its vicinity, the distance shift is found according to the intensity ratio. Accordingly, it is possible to allocate the X-ray intensity data to virtual pixels, providing a gradient of intensity thereto. For example, in a case where an intensity originally supposed to be 10000 has been 11500, it is possible to perform allocation of intensity, assuming that the pixel extends outward by a factor of 1.15. In such a case, when it is possible to assume that 0.15 of intensity is allocated to a pixel located outside, and the allocated intensity of the pixels extends outward by a factor of 1.25, allocations by factors of 0.15 and 0.25 are performed to a pixel located further outside. Repeating the process allows for the determination of the allocation function.

Figure 7A:
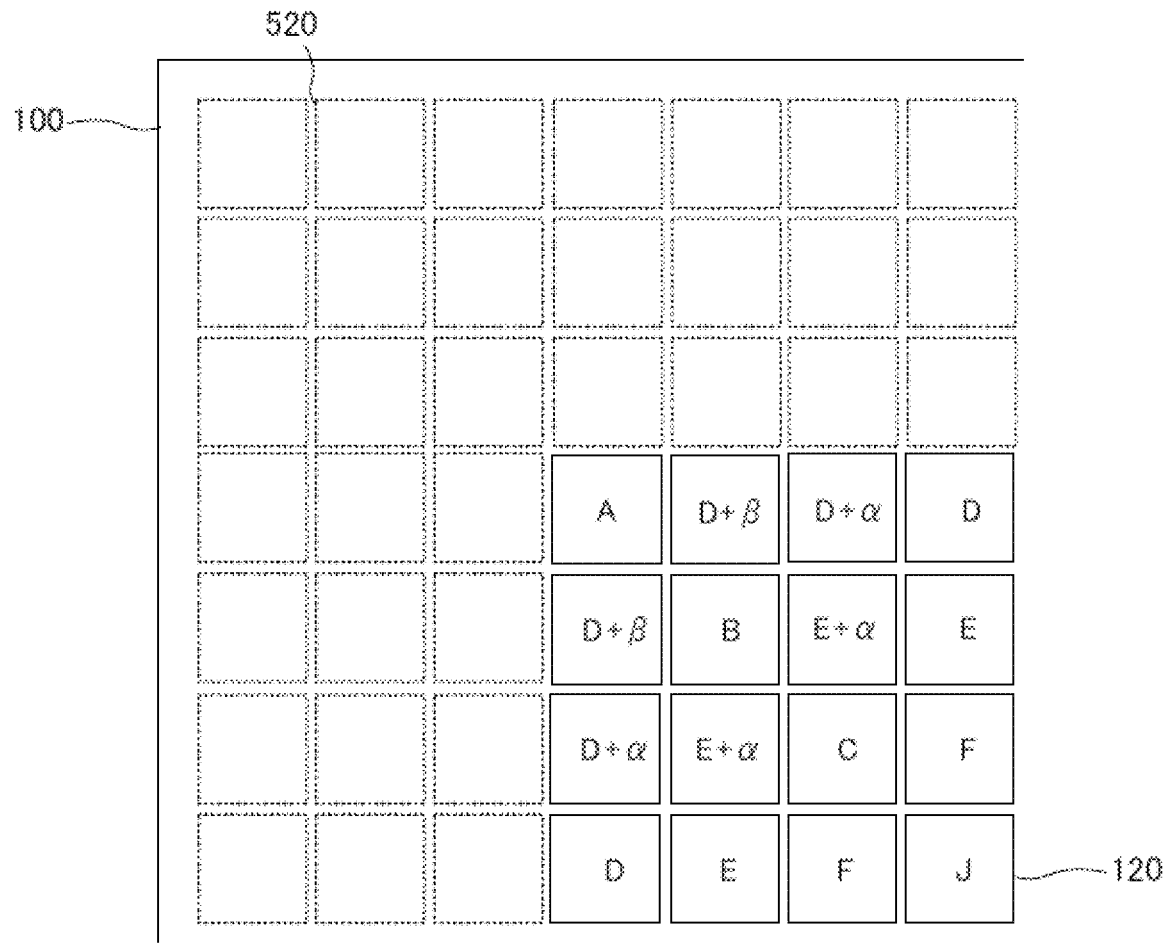
FIGS. 7A and 7B are schematic views respectively illustrating an example of pixels in a margin of the X-ray detector and an expansion rate.
Figure 7B:
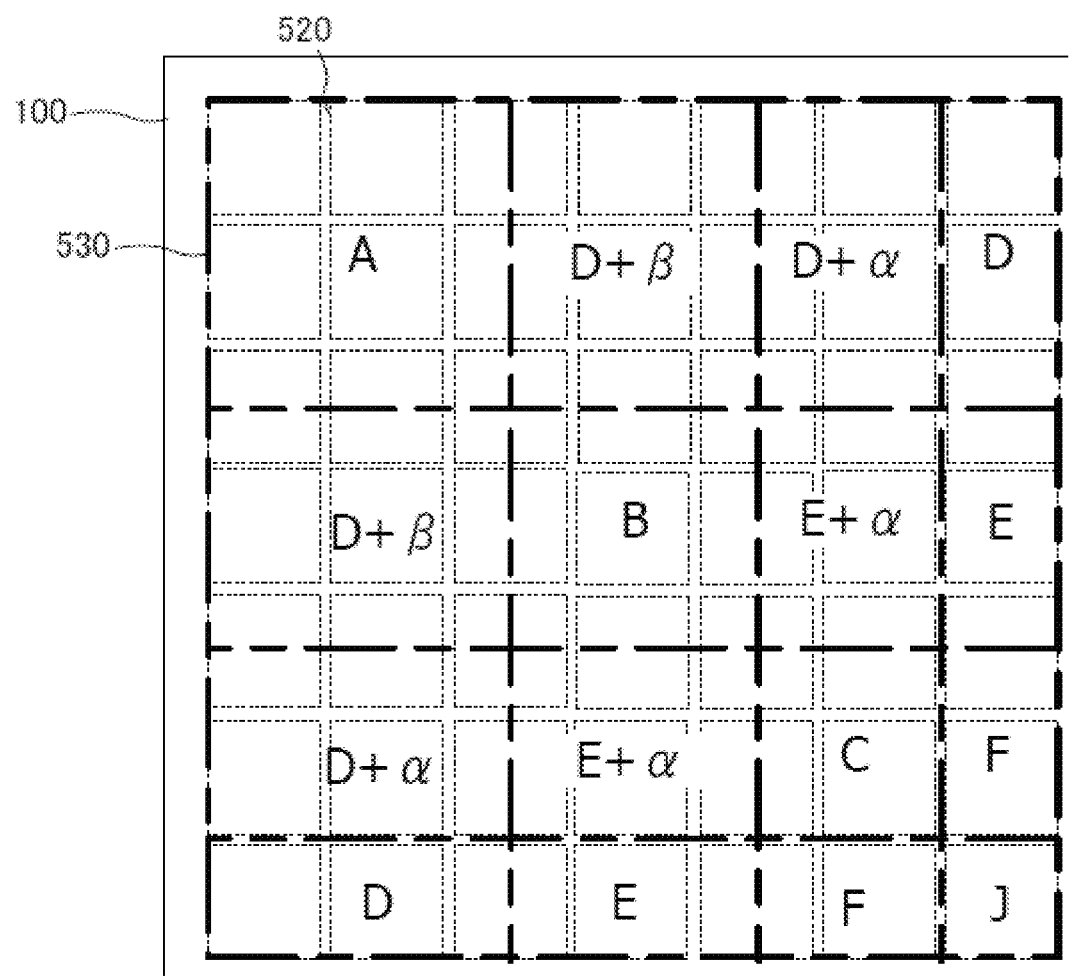

Next, a case of a two-dimensional detector is explained below. FIGS. 7A and 7B are schematic views respectively illustrating an example of pixels in a margin of the X-ray detector and an expansion rate. In the example illustrated in FIG. 7A, the pixels drawn by solid lines indicate the real pixels 120. In addition, the pixels drawn by dashed lines indicate virtual pixels 520. In the data of intensity distribution obtained by measurement, the X-ray intensity data corresponds to the real pixels 120, and there exists no data of the virtual pixels 520. The virtual pixels 520 are virtually provided up to a range to which the sensitive region reaches.

In the example illustrated in FIG. 7A, X-ray intensity data for each of the real pixels 120 is denoted A, B, C, D, D+α, D+β, E, E+α, F and J when uniform X-rays are irradiated. With regard to the data, it is possible to expand pixels and allocate data such as, for example, J=1 time (criterion), F=1.5 times, E=2 times, D=2.5 times, C≈1.5×1.5 times, B≈2×2 times, A≈2.5×2.5 times. Note that X-ray intensity data are denoted by same symbols in a case where same intensity values result from uniform irradiation due to the symmetry of arrangement.

Note that uniform irradiation ideally refers to irradiation that results in a same count value per unit area, and "symmetry results in same intensity value" indicates the ideal case. Although a statistical error may occur when actually calculating the expansion rate of each pixel, it suffices to perform measurement using a sufficiently large count value and determine the expansion rate with a condition under which statistical error becomes sufficiently small. In other words, as a result of measurement, it is possible to estimate a convergence value and the value of a pixel expressed by the same symbol as that in the above example is the same. Such a value determination method is also performed when determining a coefficient by uniformity correction.

In FIG. 7B, the size of expanded pixels 530 indicated by the dot-and-dash lines is determined on the basis of the intensity distribution of the real pixels 120 illustrated in FIG. 7A. The expanded pixels 530 calculated in this manner overlaps with the real pixels 120 and the virtual pixels 520. It is possible to determine an allocation method that allocates the X-ray intensity data to the real pixels 120 and the virtual pixels 520 in accordance with the degree of overlap. Such an allocation function may be specified by a table, for example, and stored as data of the table.

Arcuate Expanded Pixel

Figure 8A:
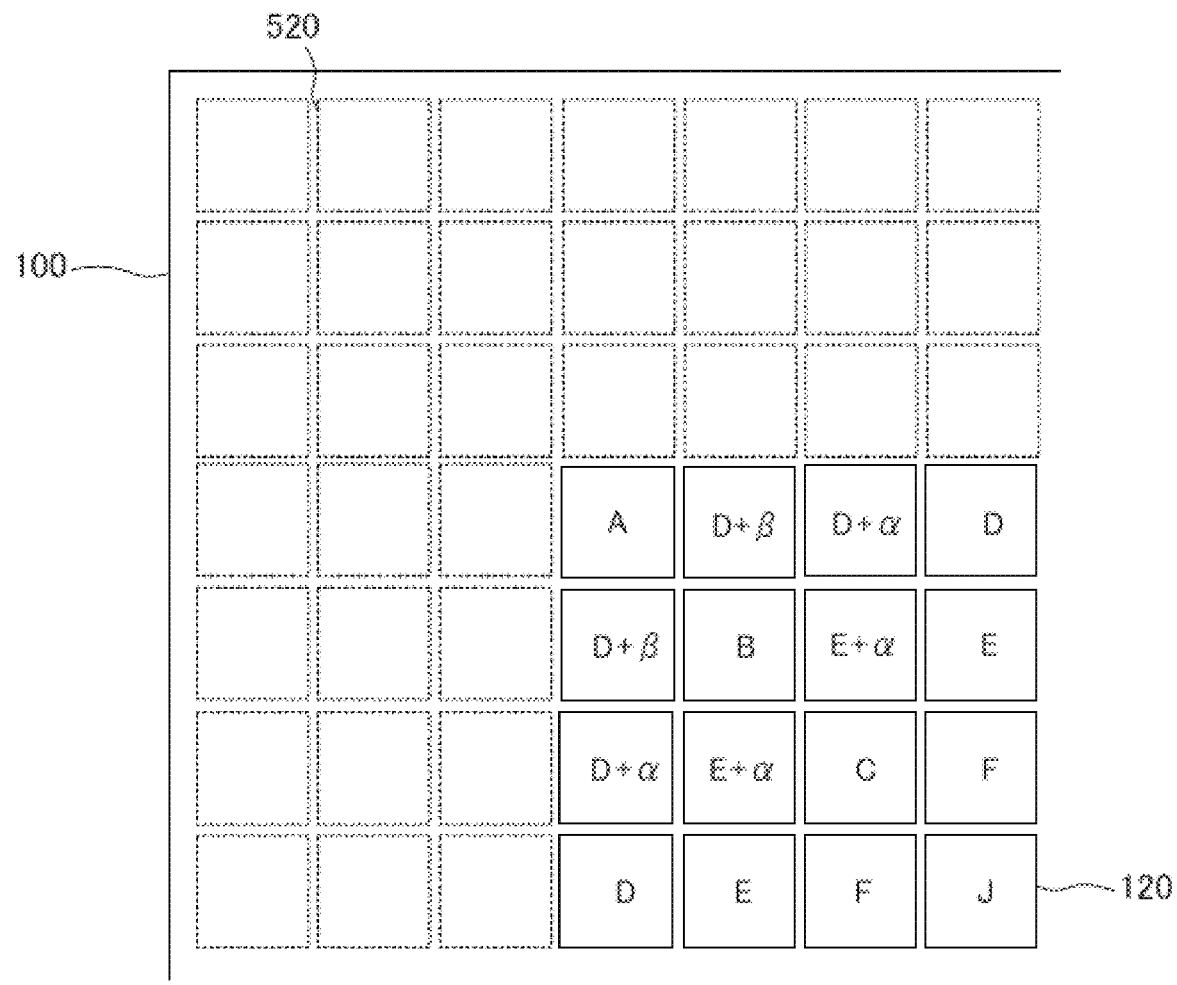
FIGS. 8A and 8B are schematic views respectively illustrating an example of pixels in the margin of the X-ray detector and an expansion rate, and FIGS. 9A and 9B respectively illustrate X-ray images before and after correction.
Figure 8B:
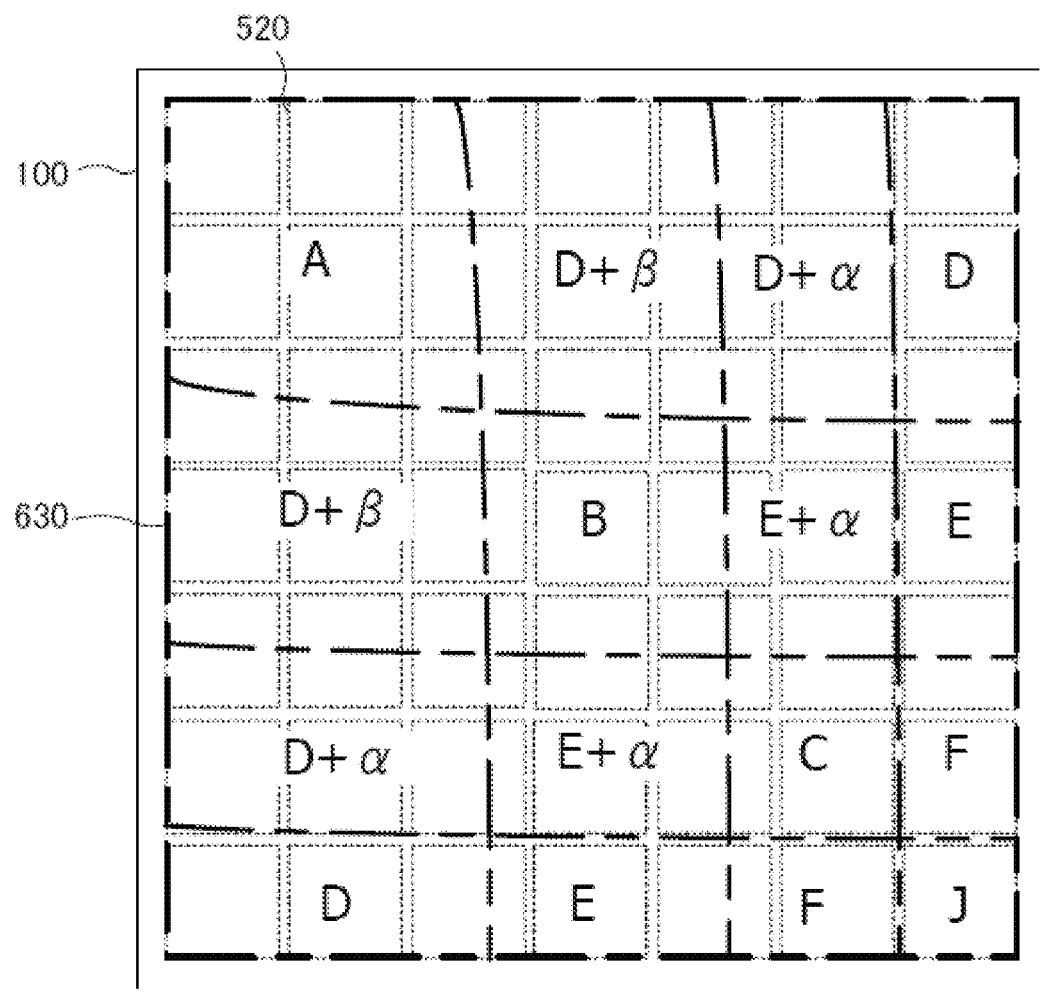

FIGS. 8A and 8B are schematic views respectively illustrating an example of pixels in the margin of the X-ray detector and an expansion rate. As illustrated by the dot-and-dash lines of the curve of FIG. 8B, it is possible to estimate that the expanded pixels 630 close to the corner (the four compartments close to the corner in the example of FIG. 8B) are arcuate, on the basis of the fact that the equipotential surface of the sensitive region is a curved surface being convex toward the detection surface side. In such a case, it is possible to generate an allocation function that allocates the X-ray intensity data to the real pixels 120 and the virtual pixels 520 overlapping with the expanded pixels 630 partitioned by a curve distorted toward the corner. Note that the shape of the curve may be predetermined on the basis of an electric field that occurs in the sensor layer 110.

EXPERIMENTAL EXAMPLE

Figure 9A:
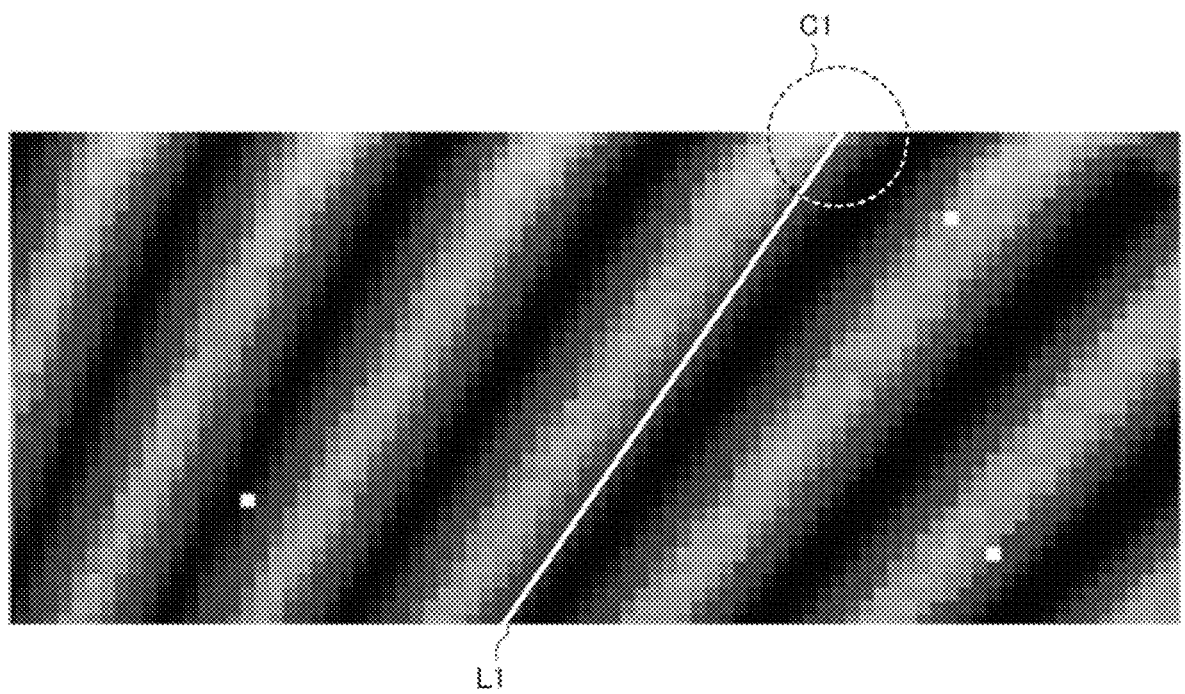
Figure 9B:
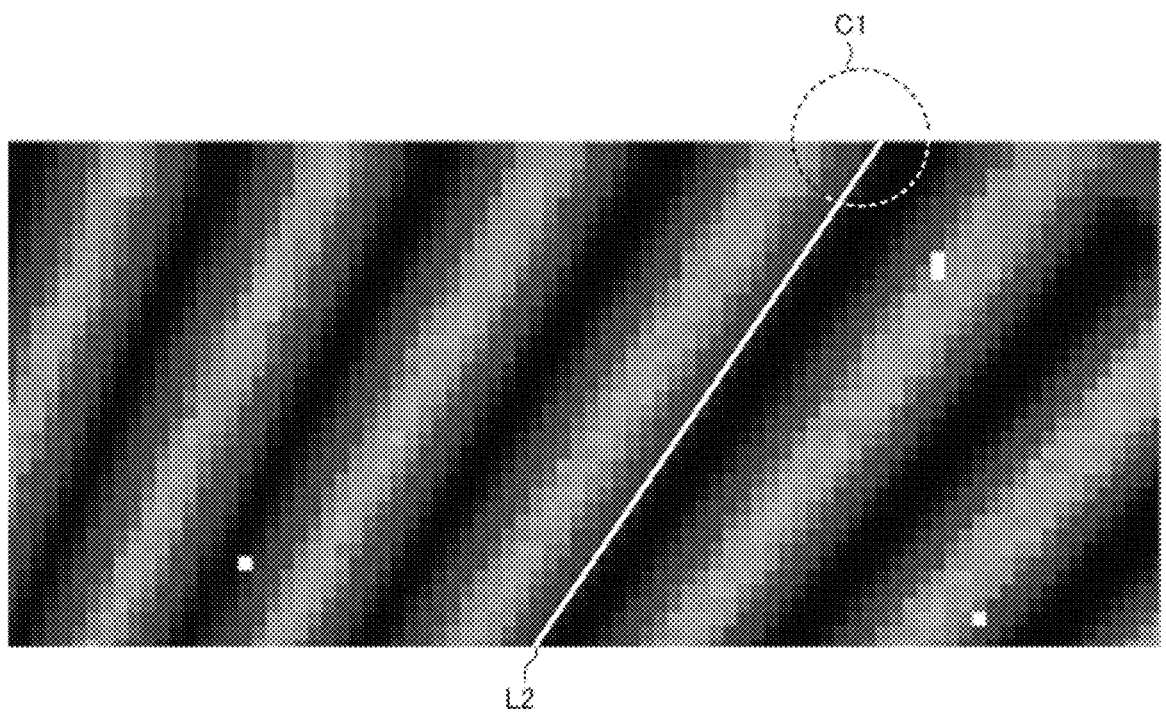

An X-ray image was photographed, and margin correction was performed using the method described above. FIGS. 9A and 9B respectively illustrate the X-ray images before and after correction. In the illustrated X-ray image, there are measured intensity distributions appearing as diagonal straight lines. Straight lines L1 and L2 as the criteria have been extended toward the marginal side along the border of the intensity distributions, on the basis of the part near the center of the straight lines respectively appearing as intensity distributions. As a result, it can be seen that the border of the intensity distributions is deviated from the straight line L1 in the region C1 of the margin in the X-ray image before correction, as illustrated in FIG. 9A, and that the intensity distributions are distorted. On the other hand, as illustrated in FIG. 9B, it can be seen that the border of the intensity distributions keeps coinciding with the straight line L2 in the region C2 of the margin, in the X-ray image after correction, and the distortion of intensity distributions has been corrected by margin correction.

As a person skilled in the art will readily appreciate, the above description is meant as an illustration of the principles of this invention. This description is not intended to limit the scope or application of this invention in that the invention is susceptible to modification, variation, and change, without departing from the spirit of this invention, as defined in the following claims.

The invention claimed is:

1. A processing apparatus that enables margin correction of X-ray intensity data, the apparatus comprising:
   a calculation unit configured to calculate an expansion rate of X-ray intensity data detected in a unit region on a marginal side, on a basis of an intensity distribution resulted from detection of uniform X-ray; and
   a first function generation unit configured to generate an allocation function that allocates the X-ray intensity data detected in the unit region on the marginal side to an outside unit region, on the basis of the expansion rate.

2. The processing apparatus according to claim 1, wherein the calculation unit is configured to calculate the expansion rate using a ratio of X-ray intensity data detected in the unit region on the marginal side against X-ray intensity data detected in an inner unit region.

3. The processing apparatus according to claim 2, wherein the calculation unit is configured to use a mean value of X-ray intensity data detected in a unit region within a particular range provided inside, as the X-ray intensity data detected in the inner unit region.

4. The processing apparatus according to claim 1, further comprising a second function generation unit configured to generate a uniformity correction function for the intensity distribution obtained via correction by the allocation function of the intensity distribution resulted from detection of uniform X-ray.

5. The processing apparatus according to claim 1, further comprising a correction unit configured to use the allocation function to perform margin correction of the intensity distribution detected by measurement.

6. The processing apparatus according to claim 5, wherein the correction unit is configured to allocate the X-ray intensity data detected in the unit region on the marginal side, providing randomness to the allocation.

7. The processing apparatus according to claim 5, wherein the correction unit is configured to use the uniformity correction function to perform uniformity correction of the intensity distribution corrected by the margin correction.

8. The processing apparatus according to claim 5, wherein the intensity distribution detected by the measurement is data provided by diffraction measurement of a single crystal.

9. A method that enables margin correction of X-ray intensity data, the method comprising the steps of:
   calculating an expansion rate of X-ray intensity data detected in a unit region on the marginal side, on a basis of an intensity distribution resulting from detection of uniform X-ray; and generating an allocation function that allocates the X-ray intensity data detected in the unit region on the marginal side to an outside unit region, on the basis of the expansion rate.

10. The method that enables margin correction of X-ray intensity data according to claim 9, further comprising the step of calculating the expansion rate using a ratio of X-ray intensity data detected in the unit region on the marginal side against X-ray intensity data detected in an inner unit region.

11. The method that enables margin correction of X-ray intensity data according to claim 10, further comprising the step of using a mean value of X-ray intensity data detected in a unit region within a particular range provided inside, as the X-ray intensity data detected in the inner unit region.

12. The method that enables margin correction of X-ray intensity data according to claim 9, further comprising a second function generation unit configured to generate a uniformity correction function for the intensity distribution obtained via correction by the allocation function of the intensity distribution resulted from detection of uniform X-ray.

13. The method that enables margin correction of X-ray intensity data according to claim 9, further comprising a correction unit configured to use the allocation function to perform margin correction of the intensity distribution detected by measurement.

14. The method that enables margin correction of X-ray intensity data according to claim 13, further comprising the step of allocating the X-ray intensity data detected in the unit region on the marginal side, providing randomness to the allocation.

15. The method that enables margin correction of X-ray intensity data according to claim 13, further comprising the step of using the uniformity correction function to perform uniformity correction of the intensity distribution corrected by the margin correction.

16. The method that enables margin correction of X-ray intensity data according to claim 13, wherein the intensity distribution detected by the measurement is data provided by diffraction measurement of a single crystal.

17. A computer-readable non-transitory storage medium storing a control program that enables margin correction of X-ray intensity data, the control program causing a computer to perform:
   calculating an expansion rate of X-ray intensity data detected in a unit region on a marginal side, on the basis of an intensity distribution resulting from detection of uniform X-ray; and
   generating an allocation function that allocates the X-ray intensity data detected in the unit region on the marginal side to an outside unit region, on the basis of the expansion rate.

* * * * *